Nov. 18, 1969     F. E. BRITTAIN     3,479,068
PERMANENTLY COUPLED ASSEMBLIES
Original Filed Aug. 31, 1966

United States Patent Office 3,479,068
Patented Nov. 18, 1969

3,479,068
PERMANENTLY COUPLED ASSEMBLIES
Frank Eustace Brittain, Birmingham, England, assignor to Girling Limited, Tyseley, Birmingham, England
Continuation of application Ser. No. 576,484, Aug. 31, 1966. This application Oct. 31, 1968, Ser. No. 772,437
Claims priority, application Great Britain, Sept. 3, 1965, 37,869/65
Int. Cl. F16l 39/00, 35/00
U.S. Cl. 285—321            3 Claims

ABSTRACT OF THE DISCLOSURE

The invention resides in a permanent sealed coupling for an hydraulic master cylinder and a reservoir therefor. The reservoir has a spigot with a conical nose portion which is received in a socket in the master cylinder. The socket has an outwardly facing shoulder at its inner end. The parts are locked together by a resilient split ring engaged in confronting grooves in the spigot and socket, and are sealed by an annular sealing member of resiliently compressible material surrounding the nose portion and held in compressed condition between the nose portion and the socket shoulder. Preferably, the sealing member is of rectangular cross-section in its free condition.

---

This application is a continuation of United States application Ser. No. 576,484 filed Aug. 31, 1966, and now abandoned.

This invention relates to permanently coupled assemblies of the spigot and socket type, and it provides a new and improved assembly which may be readily manufactured and assembled.

In accordance with the invention there is provided a permanently coupled assembly of a part having a spigot and a part having a socket which receives the spigot, in which the parts are locked together by the engagement of a resilient split ring in confronting grooves in the spigot and the socket respectively, and the parts are sealed together by means of a resiliently deformable sealing member held in compression between the parts by the action of the split ring.

The groove in one of the parts may decrease in depth towards one end therof, such that any movement apart of the parts will result in the split ring being forced more firmly into the confronting groove by the interaction of the split ring with the wall of the first mentioned groove.

The invention is particularly, but not exclusively, applicable to the coupling together of a reservoir tank and cylinder body of a master cylinder for an automobile hydraulic system.

Some constructional forms of the invention are described below, by way of example only, with reference to the accompanying drawings, in which.

Figure 1:
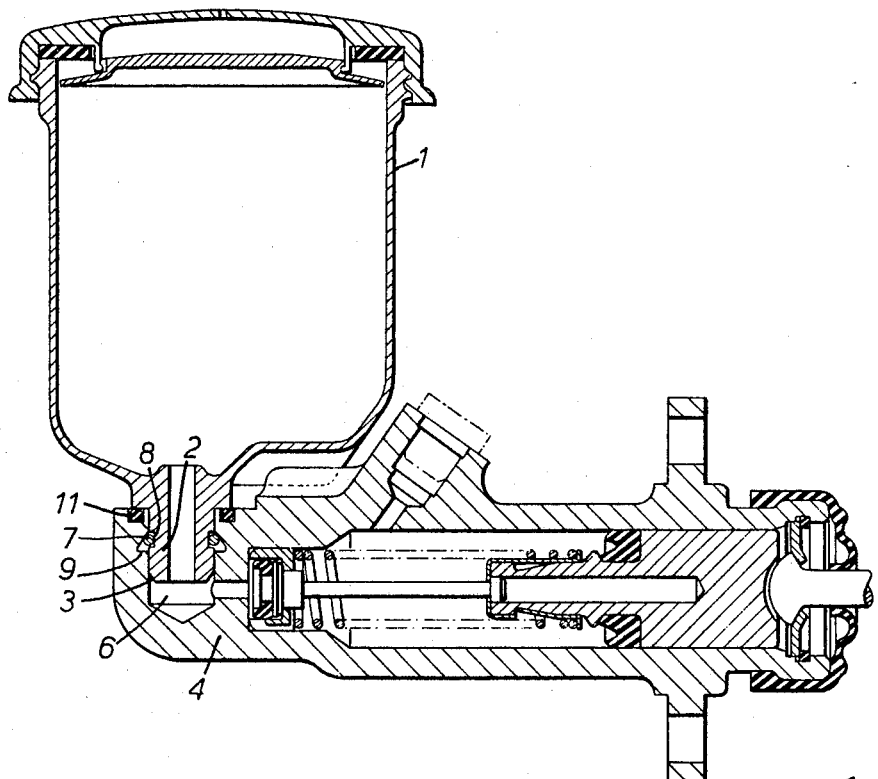
FIGURE 1 is a cross-sectional elevation of a tank and cylinder body assembly.
Figure 1A:
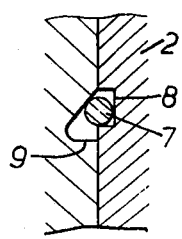
FIGURE 1A is an enlarged broken cross-sectional view showing details of the assembly of the invention.

The tank 1 is formed with a tubular spigot 2 having a chamber 4 at its lower end. The cylinder body 4 is formed with a bore or socket 6 to receive the spigot, and the parts are permanently coupled together by means of a split ring 7 engaging in confronting grooves 8 and 9 in the spigot 2 and socket 6 respectively. As particularly shown in FIGURE 1A, the spigot groove 8 is of rectangular cross-section, having parallel side walls or shoulders and a cylindrical base, while the socket groove 9 has a coned or angled base wall, so that the groove decreases in depth towards its upper end.

The parts 1 and 4 are sealed together by means of a resiliently deformable sealing ring 11 held in compression between a shoulder around the outer end of the spigot and a co-operating confronting surface formed by a counterbore at the mouth of the socket.

On initial assembly of the parts, the split-ring 7 is loosely located in the socket groove 9, the lower part of which is of sufficient diameter to accommodate the split ring completely. The spigot 2 is pushed into the socket 6 through the split ring which is expanded into the groove 9. The chamfer 3 provides a lead-in during this stage. The spigot is forced into the socket, compressing the ring 11 between the cylinder body and a shoulder on the tank, until the split ring snaps into the spigot groove 8. When the pressure used to assemble the parts is removed, the compressed ring 11 provides a biassing force tending to force the spigot out of the socket, so that the split ring is held in engagement with the lower side wall of the spigot groove 8 and the angled wall of the socket groove 9. As a result any movement of the spigot out of the socket will result in the split ring being subjected to a wedging action tending to force it further into the spigot groove 8.

Relative rotation of the tank and cylinder body after assembly is prevented by a projection or fin 13 on the cylinder body engaging in a groove in the tank.

The component parts of the above described assembly are readily manufactured, and assembled. The grooves which receive the split ring are readily machined or otherwise formed since they do not have to be very accurately dimensioned. Also, the parts coupled together may be of various materials, including metals and synthetic plastics.

Figure 2:
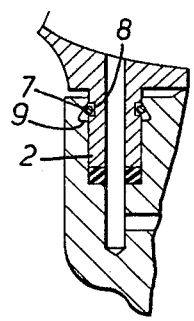
FIGURES 2 and 3 are scrap views showing two different modifications.

In the modified arrangement shown in part in FIGURE 2, the sealing ring 11 is positioned between the lower end of the spigot and a shoulder forming the bottom of the socket.

Figure 3:
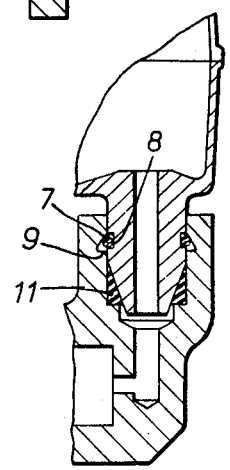

In the modification shown in FIGURE 3, the inner end of the spigot is part-conical, and the sealing member is held compressed between the inner end of the spigot and the shoulder forming the bottom of the socket. The sealing ring is initially of square section, but is deformed to the shape shown by the insertion of the spigot. In this embodiment, no special means are illustrated for preventing relative rotation between the parts, it being assumed that the master cylinder and tank are coupled together at a point remote from the axis of the spigot and socket.

Many other modifications and variations will be possible within the scope of the invention. For example, the spigot could be formed on the cylinder body and the socket on the tank, and the angled wall may be formed in the spigot groove rather than the socket groove.

The resilient split ring referred to above is of the type usually marketed under the name "Circlip."

I claim:

1. Permanently coupled assembly of an hydraulic master cylinder member with a reservoir member, comprising a cylindrical open ended socket in one of said members, a port at the inner end of said socket communicating with the interior of said member and a shoulder at the inner end of said socket, a spigot on the other of said members received in said socket and having a conically tapered nose portion, a passage extending axially through said spigot to communicate said second member and the port in said first member, a pair of confronting locking grooves in said spigot and socket, a resilient split ring engaged in said grooves, one of said grooves having a part of sufficient depth to accommodate said split ring completely, the other of said grooves having a depth less than the cross-sectional dimension of said split ring, said split ring being biased so as to deflect against the inner wall of said other groove when both of said grooves are in confronting relation to each other, said one groove decreasing in depth towards an end thereof providing an outwardly angled wall extending axially away from the part of said groove having a depth accommodating said split ring, said wall being arranged to wedge said split ring against the inner wall of said other groove in response to a force tending to pull said spigot and socket axially apart, an annular sealing member of resiliently compressible material surrounding said nose portion and being compressed between said nose portion and the cylindrical wall of said socket to seal therebetween, the inner end of said material abutting against said shoulder and being distorted in a direction solely away from said shoulder toward the open end of said socket into the space between the tapered nose of said spigot and the cylindrical wall of said socket, said sealing member being constructed and arranged that when compressed it biases said spigot toward the open end of the socket so that said split ring is positioned by the angled wall of said one groove into locking engagement with a wall of said other groove to substantially permanently lock the spigot and the socket together.

2. The assembly of claim 1 wherein the other groove of less depth than the cross-sectional dimension of the split ring is on the spigot and the one groove is in said socket, the angled wall of said one groove extending toward the open end of said socket.

3. The assembly of claim 1 wherein the socket is on the master cylinder member and the spigot is on the reservoir.

References Cited

UNITED STATES PATENTS

| | | | |
|---|---|---|---|
| 776,317 | 7/1904 | Nelson | 285—320 |
| 2,253,018 | 8/1941 | Cowles | 285—276 |
| 2,525,667 | 10/1950 | Goolsbee et al. | 285—321 X |
| 2,848,255 | 8/1958 | Klein et al. | 285—321 X |
| 2,877,732 | 3/1959 | Eaton | 285—321 X |
| 3,079,188 | 2/1963 | Oswold | 285—321 X |
| 3,314,698 | 4/1967 | Owens | 285—312 |

FOREIGN PATENTS 730,339  5/1955  Great Britain.

DAVID J. WILLIAMOWSKY, Primary Examiner

D. W. AROLA, Assistant Examiner

U.S. Cl. X.R.

60—54.6; 285—332.3, 374